Sept. 3, 1929.  A. C. MILLER  1,727,298
ENGINE CONSTRUCTION
Filed July 22, 1918
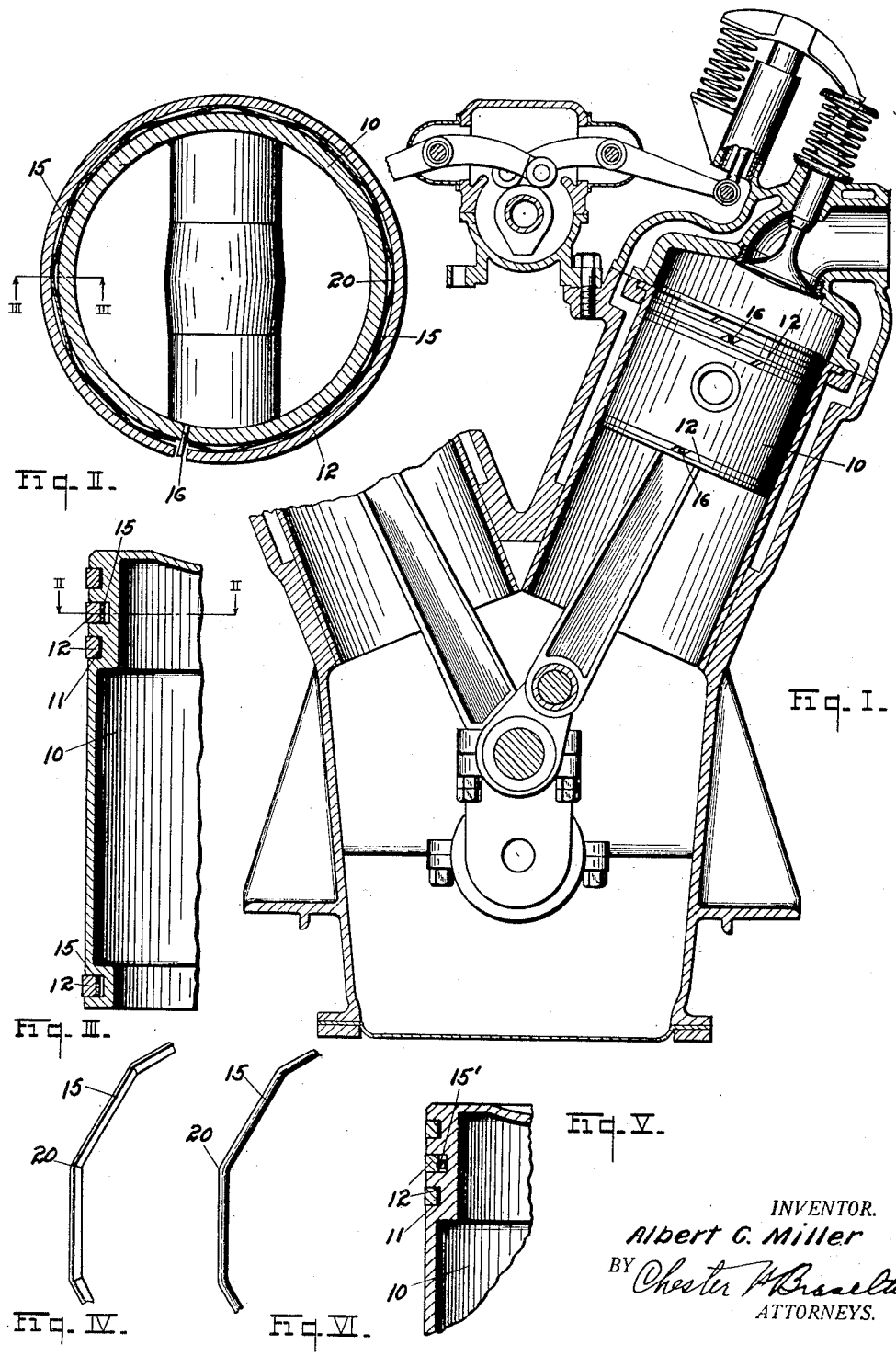
INVENTOR.
*Albert C. Miller*
BY *Chester P Braselton*
ATTORNEYS.

Patented Sept. 3, 1929.

1,727,298

UNITED STATES PATENT OFFICE.

ALBERT C. MILLER, OF ELYRIA, OHIO, ASSIGNOR TO THE WILLYS-OVERLAND COMPANY, OF TOLEDO, OHIO, A CORPORATION OF OHIO.

ENGINE CONSTRUCTION.

Application filed July 22, 1918. Serial No. 246,223.

This invention relates to an improved engine construction and has for its object to prevent what is commonly known in the art as "piston slap". The clearance between the piston and cylinder wall of an engine may vary under different operating conditions, particularly in engines of the explosive type which are relatively cold before starting and during the initial period of their operation but become heated to relatively high temperatures upon continued use of the same. Various causes may effect a variation in the clearance referred to, such as, for an example, a difference in the expansion of the piston and the expansion of the cylinder wall, and if this clearance assumes an appreciable amount in excess of that normally required for the best operation of the mechanism, reciprocation of the piston when connected to a rotary crank shaft or even when connected to a reciprocating rod as in the case of pump construction, for an example, may cause the piston to be thrust against one side of the cylinder wall and then the other as the same makes a complete reciprocation, this action being possibly more noticeable in V-type motors.

It is the object of this invention to prevent the occurrence of such an action and to provide means to maintain the piston substantially centrally of the cylinder during operation, regardless of any change in operating conditions or any forces or combination of forces tending to thrust said piston out of actual alignment with the cylinder within which it is moving.

Further objects of this invention are to provide means to yieldingly support and maintain a piston in a certain definite clearance relation with a cylinder wall, as well as prevent the piston slap referred to, to provide means to cushion the engagement between a piston and the cylinder wall and to further increase the efficiency of operation of an engine.

Further objects of this invention relate to the novel means employed to attain the result desired. The provision of means to maintain the parts used in operative position under various working conditions and various other details of construction, arrangement of parts, and association of means is herein below more specifically described and pointed out in the appended claims, it being understood, however, that the invention in its broad conception is in no way limited to the particular details of construction shown herein merely by way of illustration as one means for carrying this invention into effect.

While in no way limited to pistons made of any particular material, the invention described herein is particularly useful in connection with aluminum pistons in which the expansion and contraction of the same is somewhat greater than the pistons ordinarily used.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawings, forming a part of this specification, in which:

Figure I is a partial, vertical, sectional view of a V type motor embodying this invention.

Figure II is a transverse, sectional view on line II—II of Figure III.

Figure III is a sectional view on the line III—III of Figure II.

Figure IV is a detail, perspective view of a portion of the spring elements employed in the particular construction illustrated in Figures I, II and III, and Figures V and VI represent sectional views and perspective views respectively of a modified form of spring unit which may be employed.

Although it is to be understood that the means disclosed herein for maintaining a piston substantially centrally of a cylinder may be associated with a cylinder wall, as well as the piston itself, in the drawing the invention is shown with the particular means used associated with the piston. Thus, the piston 10 is provided with a plurality of recesses 11 to receive the piston rings 12 as is the usual practice, it being understood that any number of rings may be used as desired. Certain of the recesses 11 are made somewhat deeper than others and a polygonal open ended leaf spring 15 is interposed between the bottom of the recess and a piston ring 12. If desired, a pin 16 may be inserted in the wall of the piston to engage the ends of the spring 15, as well as the ends of the ring 12, preventing rotational movement of both spring and ring relative to the piston. Preferably a similar spring 15 is interposed as shown adjacent the other end of the piston and facilitates the operation of the mechanism as intended, although it is to be understood that the number of springs used is wholly a matter of choice and judgment.

The modification shown in Figures V and VI is of the same general construction as that shown in other figures of the drawing, with the exception that instead of using a flat spring 15 a spring 15′ substantially circular in cross-section is used.

Attention is called to the fact that the pin 16 may be used to maintain the springs 15 and 15′ in such a position that a bowed portion 20 of the spring will come in line with the intersection of the diameters passing through the center of the wrist pin, both crosswise and axially thereof with the piston's circumference so that the greatest possible resistance may be afforded in a direct line against the forces acting to cause a thrust of the piston against the cylinder wall, which, while usually in a direction at right angles to the longitudinal axis of the wrist pin, may also operate in a direction in alignment therewith.

The operation of the invention in the particular exemplification chosen herein as an illustration thereof, will, it is believed, be readily understood from the foregoing. Whenever, under any operating conditions of an engine with my invention applied thereto, there is an excessive clearance between the piston and cylinder wall due to any causes, such, for example, as an excessive amount of contraction of the piston relative to the cylinder wall, or an excessive amount of expansion of the cylinder wall relative to the piston, and there is a tendency to thrust the piston against the cylinder wall, both at the upper right hand portion of the cylinder and the lower left hand portion thereof, shown in Figure I and at various other portions thereof, the spring 15 constituting a yieldable but strong resistance, operates to absorb the forces tending to cause the action referred to to prevent the thrusting of the pison against the cylinder wall, and maintain the piston substantially centrally of the cylinder under all and various operating conditions thereof.

It is to be understood that my invention is not limited to its application to a piston but might be associated with the cylinder, if such arrangement were desired, or construction in which a piston is connected to a rotary crank shaft but the same may be applied when a reciprocating piston rod is used, such as might be found in a pump mechanism coupled up directly with an engine operating the same.

I am aware that the particular embodiment of my invention, which I have here shown and described, is susceptible of considerable variation without departing from the spirit thereof, and, therefore, I desire to claim the same broadly, as well as specifically, as indicated by the appended claims.

Having thus described my invention, what I claim as new and desire to secure by Letters Patent, is:

1. In an internal combustion engine, a piston having an annular recess in its peripheral wall, a ring in said recess and a spring therein for cushioning said ring, said spring comprising a polygonal member having a plurality of substantially straight sides engaging the bottom wall of the recess tangentially and the connecting portions between adjacent sides engaging the inner face of the ring.

2. In an internal combustion engine, a piston having an annular recess in its peripheral wall, a split ring in said recess, a spring therein beneath said ring, said spring being in the form of a polygonal split ring and comprising a plurality of substantially straight sections tangent to the bottom of said recess and means carried by said piston and projecting between the ends of said spring for positioning said spring so as to bring points of bearing between said spring and ring into the diameter at right angles to the piston pin.

3. An article of manufacture comprising a ribbon of spring metal having the general form of a polygon, each of whose corners connecting the sides is rounded outwardly describing an arc struck from a point within the boundary of said polygon, each of the said sides having greater length between said corners than the length of the radius of any circle of which any one of the arcs is a part.

4. A device for insertion in a piston ring groove behind the piston ring, comprising a single piece of spring metal substantially polygonal in form, having a plurality of sides bent inwardly at an obtuse angle with relation to the adjacent sides.

5. A device for insertion in a piston ring groove behind the piston ring, consisting of a ribbon of spring metal having substantially the form of a polygon whose sides are substantially straight and connected by curved portions having less length than the sides.

6. A device for insertion in a piston ring groove behind the piston ring, consisting of a ribbon of spring metal having substantially the form of a polygon whose sides are connected by bends having a radius of less length than the diameter of the polygon.

7. In combination with a piston and piston ring, of an expanding device interposed between the two, comprising a ribbon of spring metal having substantially the form of a polygon whose sides are substantially straight and lie against the piston, said sides being joined by outwardly curved and relatively shorter portions adapted to engage the piston ring.

In testimony whereof, I affix my signature.

ALBERT C. MILLER.